(12) United States Patent
Choi et al.

(10) Patent No.: US 10,341,955 B2
(45) Date of Patent: Jul. 2, 2019

(54) MOBILE TERMINAL AND METHOD FOR CONTROLLING SAME

(71) Applicant: LG ELECTRONICS INC., Seoul (KR)

(72) Inventors: Hyeonchang Choi, Seoul (KR); Jinho Park, Seoul (KR); Joohyun Lee, Seoul (KR); Jaesuk Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 15/305,992

(22) PCT Filed: Mar. 9, 2015

(86) PCT No.: PCT/KR2015/002232
§ 371 (c)(1),
(2) Date: Oct. 21, 2016

(87) PCT Pub. No.: WO2015/163576
PCT Pub. Date: Oct. 29, 2015

(65) Prior Publication Data
US 2017/0048801 A1  Feb. 16, 2017

(30) Foreign Application Priority Data

Apr. 22, 2014  (KR) ......................... 10-2014-0048055

(51) Int. Cl.
*H04W 52/02* (2009.01)
*H04W 88/02* (2009.01)

(52) U.S. Cl.
CPC ... *H04W 52/0264* (2013.01); *H04W 52/0229* (2013.01); *H04W 88/02* (2013.01); *H04W 52/0216* (2013.01); *H04W 52/0251* (2013.01); *Y02D 70/00* (2018.01); *Y02D 70/142* (2018.01); *Y02D 70/144* (2018.01); *Y02D 70/164* (2018.01); *Y02D 70/26* (2018.01)

(58) Field of Classification Search
None
See application file for complete search history.

(56) References Cited

U.S. PATENT DOCUMENTS

| | | | | |
|---|---|---|---|---|
| 9,049,617 | B2 * | 6/2015 | Tofighbakhsh | H04L 41/5067 |
| 9,531,651 | B1 * | 12/2016 | Cherubini | H04L 51/00 |
| 9,717,055 | B2 * | 7/2017 | Su | H04W 52/0229 |
| 9,853,887 | B2 * | 12/2017 | Ogawa | H04L 45/26 |
| 9,928,122 | B2 * | 3/2018 | Yang | G06F 9/542 |
| 2007/0105526 | A1 * | 5/2007 | Shoobridge | H04B 1/1027 455/343.6 |

(Continued)

FOREIGN PATENT DOCUMENTS

| | | |
|---|---|---|
| KR | 10-2012-0014233 A | 2/2012 |
| KR | 10-2012-0062836 A | 6/2012 |

(Continued)

*Primary Examiner* — Otis L Thompson, Jr.
(74) *Attorney, Agent, or Firm* — Birch, Stewart, Kolasch & Birch, LLP

(57) ABSTRACT

A method for controlling a mobile terminal includes: determining whether one or more alarm trigger signals satisfy a set alarm transmission period; and when the set alarm transmission period is satisfied, collectively transmitting the one or more alarm trigger signals at a specific time, thereby reducing current consumption.

19 Claims, 24 Drawing Sheets

(56) References Cited

U.S. PATENT DOCUMENTS

| | | | |
|---|---|---|---|
| 2010/0313050 A1 | 12/2010 | Harrat et al. | |
| 2011/0040996 A1* | 2/2011 | Hackborn | G06F 11/3409 |
| | | | 713/340 |
| 2011/0055613 A1 | 3/2011 | Mandyam | |
| 2012/0221722 A1* | 8/2012 | Boberg | H04L 41/5009 |
| | | | 709/224 |
| 2012/0295645 A1* | 11/2012 | Yariv | H04L 67/322 |
| | | | 455/466 |
| 2013/0290879 A1* | 10/2013 | Greisson | H04M 1/72522 |
| | | | 715/764 |
| 2014/0029498 A1* | 1/2014 | Kim | H04W 52/0277 |
| | | | 370/311 |
| 2014/0235282 A1* | 8/2014 | Kansal | H04W 4/20 |
| | | | 455/466 |
| 2014/0351744 A1* | 11/2014 | Jeon | G06F 3/0482 |
| | | | 715/781 |
| 2015/0208352 A1* | 7/2015 | Backholm | H04W 52/0251 |
| | | | 455/574 |
| 2015/0209669 A1* | 7/2015 | Zhou | H04W 4/21 |
| | | | 463/40 |
| 2015/0234442 A1* | 8/2015 | Emami | G06F 1/3206 |
| | | | 713/323 |
| 2015/0254704 A1* | 9/2015 | Kothe | G06Q 30/06 |
| | | | 705/14.26 |
| 2016/0041597 A1* | 2/2016 | Graham | G06F 1/3212 |
| | | | 713/323 |
| 2016/0154549 A1 | 6/2016 | Chaudhri et al. | |
| 2016/0192435 A1 | 6/2016 | Gupta et al. | |
| 2017/0177079 A1* | 6/2017 | George-Svahn | G06F 3/013 |
| 2017/0245217 A1* | 8/2017 | Kim | H04W 68/005 |

FOREIGN PATENT DOCUMENTS

| | | |
|---|---|---|
| KR | 10-2014-0025552 A | 3/2014 |
| KR | 10-2014-0031381 A | 3/2014 |

* cited by examiner

FIG. 4
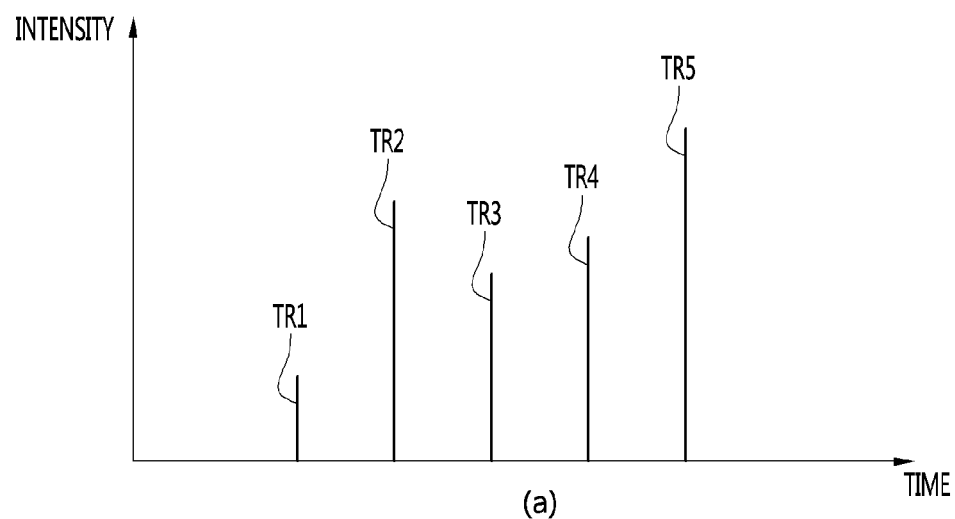
(a)
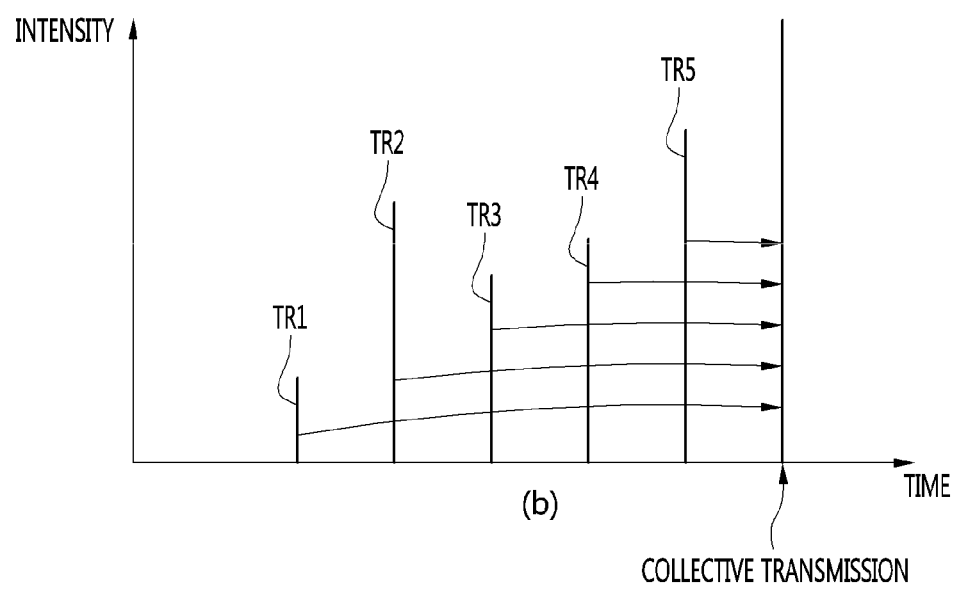
(b)
COLLECTIVE TRANSMISSION

FIG. 5
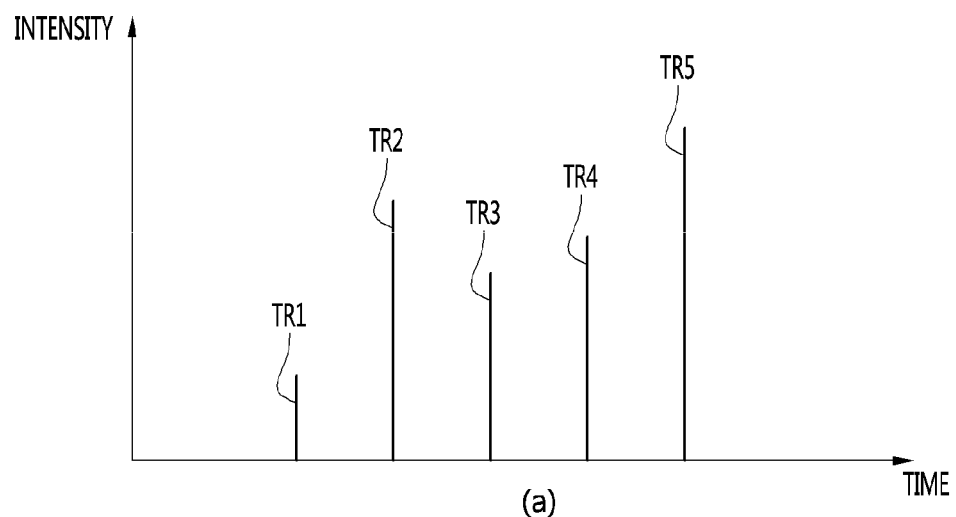
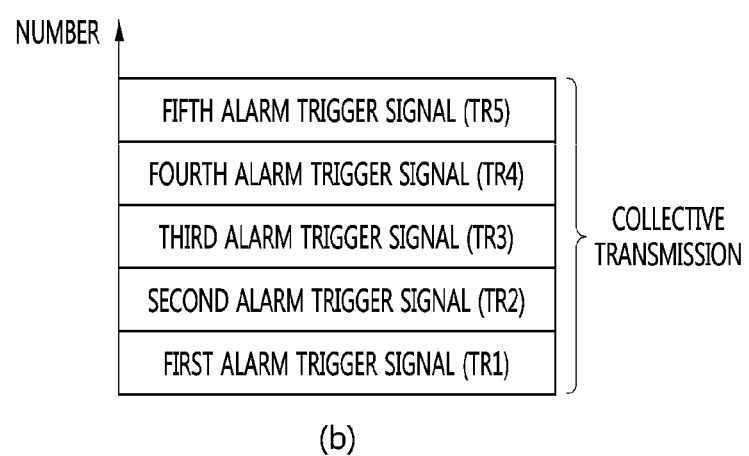

FIG. 6
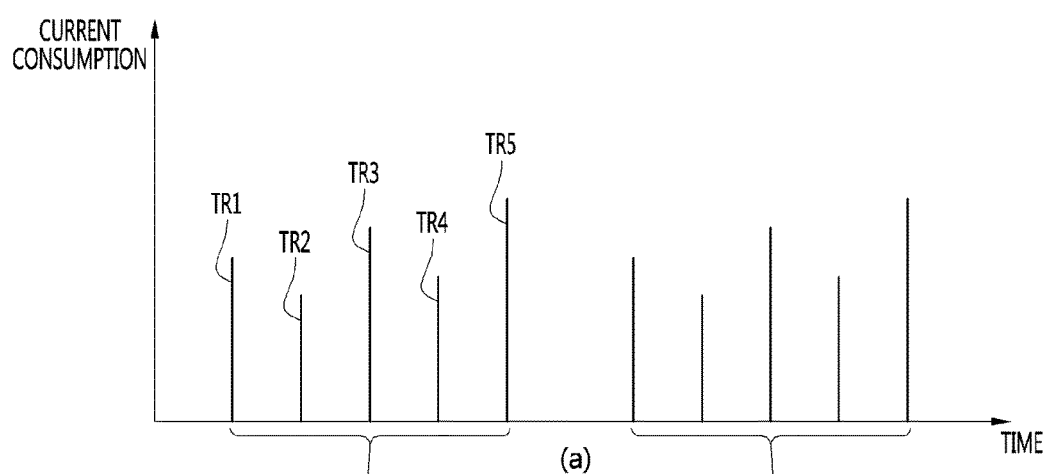
(a)
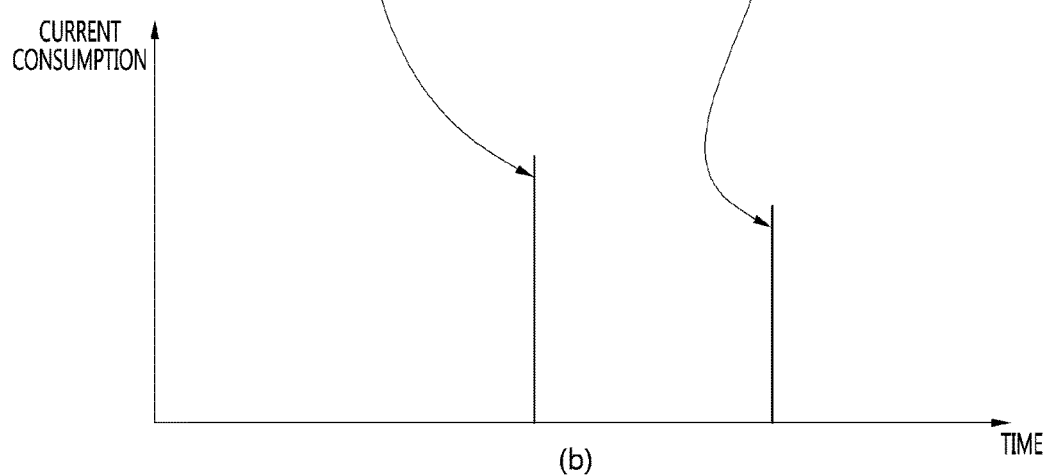
(b)

FIG. 16

| | | SUPPORT MODE | | | |
|---|---|---|---|---|---|
| | | Normal Mode | Hard Mode | Ultra Mode | Customize Mode |
| SUPPORT FUNCTION | ALARM SCHEDULING | O | O | O | USER SELECTION |
| | CPU FREQUENCY RESTRICTION | O | O | O | USER SELECTION |
| | TOUCH RESPONSE SPEED CHANGE | O | O | O | USER SELECTION |
| | Wi-Fi SCANNING PERIOD CHANGE | O | O | O | USER SELECTION |
| | WAKELOCK TYPE CONTROL | O | O | O | USER SELECTION |
| | NOTIFICATION LED OFF | O | O | O | USER SELECTION |
| | TOUCH VIBRATION OFF | O | O | O | USER SELECTION |
| | AUTOMATIC SCREEN ORIENTATION SWITCHING OFF | O | O | O | USER SELECTION |
| | SCREEN CHANGE ANIMATION OFF | O | O | O | USER SELECTION |
| | Wi-Fi OFF | - | O | O | USER SELECTION |
| | Wi-Fi TETHERING OFF | - | O | O | USER SELECTION |
| | Bluetooth OFF | - | O | O | USER SELECTION |
| | GPS OFF | - | O | O | USER SELECTION |
| | Auto-Sync OFF | - | O | O | USER SELECTION |
| | Mobile Data OFF | - | - | O | USER SELECTION |
| | BRIGHTNESS ADJUSTMENT | - | - | - | USER SELECTION |
| | LCD TURN-OFF TIME CONTROL | - | - | - | USER SELECTION |

MOBILE TERMINAL AND METHOD FOR CONTROLLING SAME

CROSS REFERENCE TO RELATED APPLICATIONS

This application is the National Phase of PCT International Application No. PCT/KR2015/002232, filed on Mar. 9, 2015, which claims priority under 35 U.S.C. 119(a) to Patent Application No. 10-2014-0048055, filed in the Republic of Korea on Apr. 22, 2014, all of which are hereby expressly incorporated by reference into the present application.

TECHNICAL FIELD

The present disclosure relates to a mobile terminal which efficiently manages power and a method for controlling the same.

BACKGROUND ART

Depending on whether terminals are movable, the terminals are divided into mobile/portable terminals and stationary terminals. Again, the mobile terminals may be divided into handheld terminals and vehicle mounted terminals depending on whether users can carry the mobile terminals personally.

Functions of the mobile terminals become diversified. For example, the functions include data and voice communication, image capturing and video recording through a camera, voice recording, music file playback through a speaker system, and an image or video output to a display unit. Some terminals may have an additional electronic game play function or a multimedia player function. Especially, recent mobile terminals may receive multicast signals for providing visual contents such as broadcasts and video or television programs.

As functions of a terminal are diversified, such a terminal may be implemented in a form of a multimedia player with multi-functions, for example, image or video capturing, playback of music or video files, game plays, and broadcast reception.

As described above, as various functions are added to the mobile terminals, power consumption significantly increases, but battery performance does not satisfy the increase in the power consumption.

However, the power consumed by the mobile terminals is mostly caused by unnecessarily enabled functions.

For example, although a user ends an application, the corresponding application is not actually ended and is still enabled to continuously consume a current.

Therefore, there is a need for a method for disabling these unnecessarily enabled functions.

Disclosure of the Invention Technical Problem

Embodiments are directed to solving the above-described problem and other problems. Embodiments provide a mobile terminal which efficiently manages power and a method for controlling the same.

Technical Solution

In one embodiment, a method for controlling a mobile terminal includes: determining whether one or more alarm trigger signals are generated; determining whether the one or more alarm trigger signals satisfy a set alarm transmission period; and when the set alarm transmission period is satisfied, collectively transmitting the one or more alarm trigger signals at a specific time.

In another embodiment, a mobile terminal includes: a display configured to display one or more application items capable of executing one or more applications; and a control unit configured to determine whether one or more alarm trigger signals for the one or more applications are generated, determine whether the one or more alarm trigger signals satisfy a set alarm transmission period, and when the set alarm transmission period is satisfied, collectively transmit the one or more alarm trigger signals to the one or more applications at a specific time.

Advantageous Effects

The effects of a mobile terminal and a method for controlling the same according to the present invention are described as follows.

According to at least one of embodiments of the present invention, when a preset alarm transmission period is satisfied, collective transmission is performed to thereby significantly reduce current consumption. Ultimately, power consumption can be reduced.

Additionally, according to at least one of embodiments of the present invention, when a battery level is less than a set battery level, a wakelock causing current consumption is detected and an application holding the detected wakelock is ended, thereby reducing power consumption.

Additionally, according to at least one of embodiments of the present invention, power consumption can be efficiently managed by selectively employing a plurality of power saving modes having different restriction functions.

Additionally, according to at least one of embodiments of the present invention, a power saving mode entry item is displayed to facilitate a power saving mode setting or a power saving mode change by an operation of the power saving mode entry item, thereby improving user convenience.

Further scope of the applicability of the present invention will be clarified through the detailed description given hereinafter. It should be understood, however, that the specific examples, while indicating preferred embodiments of the present invention, are presented for illustration only. Various changes and modifications within the spirit and scope of the present invention will become apparent to those skilled in the art from the detailed description.

BRIEF DESCRIPTION OF THE DRAWINGS

FIG. 4 are views illustrating an alarm delay section as an example of the alarm transmission period.

FIG. 5 are views illustrating the number of alarm trigger signals as an example of the alarm transmission period.

FIG. 6 are views illustrating current consumption when alarm trigger signals are transmitted in real time and current consumption when alarm trigger signals are collectively transmitted.

FIG. 16 is a table related to a plurality of power saving modes having different restriction functions.

MODE FOR CARRYING OUT THE INVENTION

Figure 1:
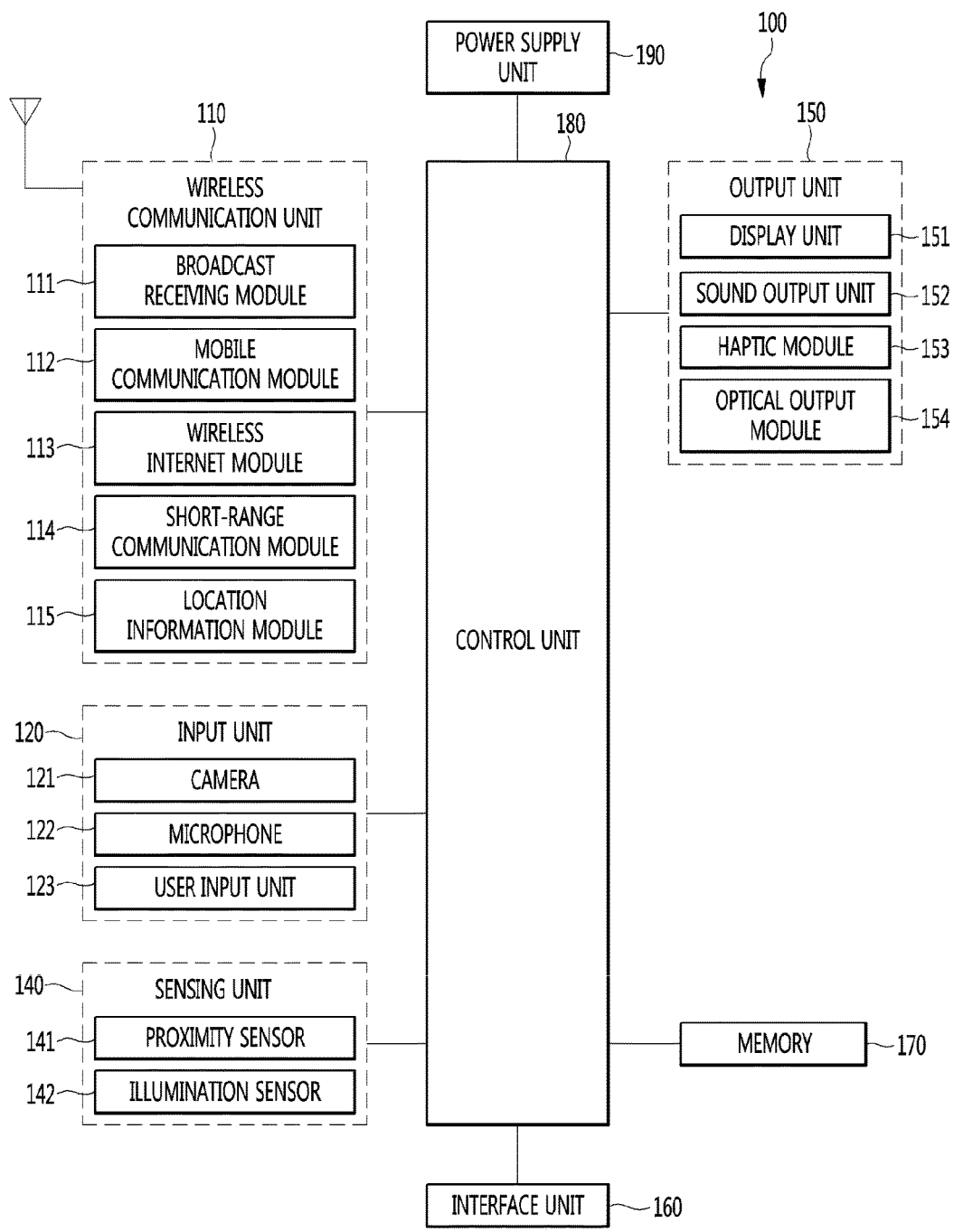
FIG. 1 is a block diagram illustrating a mobile terminal according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

The terms of a singular form may include plural forms unless they have a clearly different meaning in the context.

Additionally, in this specification, the meaning of "include," "comprise," "including," Or "comprising," specifies a property, a region, a fixed number, a step, a process, an element and/or a component but does not exclude other properties, regions, fixed numbers, steps, processes, elements and/or components.

Mobile terminals described in this specification may include mobile phones, smartphones, laptop computers, terminals for digital broadcast, personal digital assistants (PDAs), portable multimedia players (PMPs), navigation systems, slate PCs, tablet PCs, ultrabooks, and wearable devices (for example, smart watches, smart glasses, and head mounted displays (HMDs)).

However, it is apparent to those skilled in the art that configurations according to embodiments of the present invention disclosed in this specification are applicable to stationary terminals such as digital TVs, desktop computers, and digital signage, except for the case applicable to only mobile terminals.

FIG. 1 is a block diagram illustrating a mobile terminal according to an embodiment of the present invention.

The mobile terminal 100 may include a wireless communication unit 110, an input unit 120, a sensing unit 140, an output unit 150, an interface unit 160, a memory 170, a control unit 180, and a power supply unit 190. In implementing a mobile terminal, components shown in FIG. 1 are not necessary, so that a mobile terminal described in this specification may include components less or more than the components listed above.

In more detail, the wireless communication unit 110 in the components may include at least one module allowing wireless communication between the mobile terminal 100 and a wireless communication system, between the mobile terminal 100 and another mobile terminal 100, or between the mobile terminal 100 and an external server. Additionally, the wireless communication unit 110 may include at least one module connecting the mobile terminal 100 to at least one network.

The wireless communication unit 110 may include at least one of a broadcast receiving module 111, a mobile communication module 112, a wireless internet module 113, a short-range communication module 114, and a location information module 115.

The input unit 120 may include a camera 121 or an image input unit for image signal input, a microphone 122 or an audio input unit for receiving audio signal input, and a user input unit 123 (for example, a touch key and a mechanical key) for receiving information from a user. Voice data or image data collected by the input unit 120 are analyzed and processed as a user's control command.

The sensing unit 140 may include at least one sensor for sensing at least one of information in a mobile terminal, environmental information around a mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output unit 152, a haptic module 153, and an optical output unit 154. The display unit 151 may be formed with a mutual layer structure with a touch sensor or formed integrally, so that a touch screen may be implemented. Such a touch screen may serve as the user input unit 123 providing an input interface between the mobile terminal 100 and a user and an output interface between the mobile terminal 100 and a user at the same time.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 160, the mobile terminal 100 may perform an appropriate control relating to the connected external device.

Additionally, the memory 170 may store data supporting various functions of the mobile terminal 100. The memory 170 may store a plurality of application programs (for example, application programs or applications) running on the mobile terminal 100 and also data and commands for operations of the mobile terminal 100. At least part of such an application program may be downloaded from an external server through a wireless communication. Additionally, at least part of such an application program may be included in the mobile terminal 100 from the time of shipment in order to perform a basic function (for example, an incoming call, a transmission function, and a message reception) of the mobile terminal 100. Moreover, an application program may be stored in the memory 170 and installed on the mobile terminal 100, so that it may run to perform an operation (or a function) of the mobile terminal 100 by the control unit 180.

The control unit 180 may control overall operations of the mobile terminal 100 generally besides an operation relating to the application program. The control unit 180 may provide or process appropriate information or functions to a user by processing signals, data, and information inputted/outputted through the above components or executing application programs stored in the memory 170.

Additionally, in order to execute an application program stored in the memory 170, the control unit 180 may control at least part of the components shown in FIG. 1. Furthermore, in order to execute the application program, the control unit 180 may combine at least two of the components in the mobile terminal 100 and may then operate it.

The power supply unit 190 may receive external power or internal power under a control of the control unit 180 and may then supply power to each component in the mobile terminal 100. The power supply unit 190 includes a battery and the battery may be a built-in battery or a replaceable battery.

At least part of the each component may operate cooperatively in order to implement operations, controls, or control methods of a mobile terminal 100 according to various embodiments of the present invention described below. Additionally, the operations, controls, or control methods of a mobile terminal 100 may be implemented on the mobile terminal 100 by executing at least one application program stored in the memory 170.

Hereinafter, embodiments of control methods that can be implemented in the mobile terminal as configured above will be described with reference to the accompanying drawings. It is obvious to those skilled in the art that the present invention may be embodied in different forms without departing from the sprit and scope of the present invention.

In the descriptions of first to third embodiments of the present invention, the item may represent an icon or a menu, but is not limited thereto.

FIGS. 2 to 6 illustrate a method for reducing current consumption by adjusting an alarm notification timing.

Figure 2:
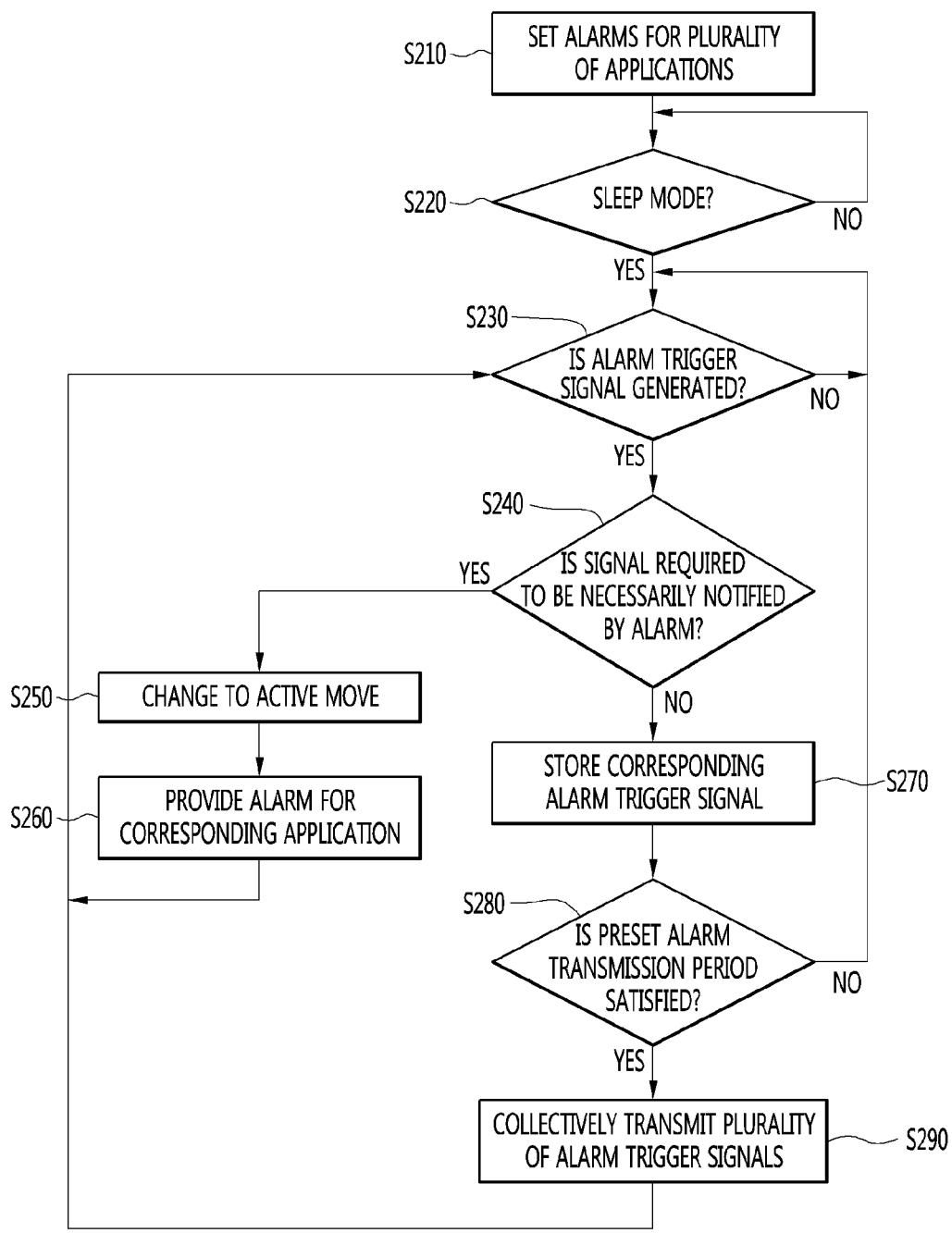
FIG. 2 is a flowchart illustrating a method for controlling a mobile terminal according to a first embodiment of the present invention.

FIG. 2 is a flowchart illustrating a method for controlling the mobile terminal according to a first embodiment of the present invention.

Referring to FIG. 2, the control unit 180 of the mobile terminal 100 performs control to set alarms to a plurality of applications (S210). The plurality of applications may be various applications such as a calendar application for reserving a schedule or the like, a social network service (SNS) application for periodically providing an alarm, an internet cafe application, a game application, a shopping application, a travel application, a lodging application, and a real estate application, but are not limited thereto.

In some of these applications, for example, in the calendar application, a schedule for a scheduled date and time has to be accurately notified to a user by alarm, so that the user can recognize and keep to the schedule. However, alarms for pieces of relevant information provided by other applications, for example, the shopping application or the internet cafe application, are not necessarily required to be notified to a user at a set time.

In some of these applications, alarming time may be set by a user, and in other applications, alarming time may be set by providers or developers of the corresponding applications.

The control unit 180 may perform control to change an active mode to a sleep mode when a user does not use a terminal for a certain time (S220). The active mode means a state in which a screen of the display unit 151 is turned on, that is, the screen of the display unit 151 is supplied with power, so that a plurality of items are displayed thereon and can be enabled in response to a user's touch command. The item may be an icon, but is not limited thereto. The sleep mode means a state in which the screen of the display unit 151 is turned off, that is, the screen of the display unit 151 is not supplied with power, and thus, no items are displayed on the screen. As described above, since power is not supplied to the screen in the sleep mode, power consumption of the mobile terminal 100 can be reduced. Accordingly, it is necessary to always operate the mobile terminal 100 in the sleep mode even when the mobile terminal 100 is not in a specific situation.

The control unit 180 determines whether an alarm trigger signal is generated after the change to the sleep mode (S230). The alarm trigger signal may serve to enable an alarm function of a corresponding application.

When the control unit 180 determines that the alarm trigger signal is generated, the control unit 180 determines whether the corresponding alarm trigger signal is a signal required to be necessarily notified by alarm (S240). As described above, in the case of the calendar application among the plurality of applications, an alarm for a scheduled date and time has to be accurately notified to a user, so that the user can keep to the schedule. Therefore, an alarm trigger signal for the calendar application may be a signal required to be necessarily notified by alarm.

When the alarm trigger signal is the signal required to be necessarily notified by alarm, the control unit 180 changes the sleep mode to the active mode (S250), and performs control to transmit the alarm trigger signal to the corresponding application so as to provide an alarm for the corresponding application (S260).

When the alarm trigger signal is not the signal required to be necessarily notified by alarm, the control unit 180 may temporarily store the corresponding alarm trigger signal in the memory 170 (S270).

The control unit 180 determines whether a preset alarm transmission period is satisfied (S280). The preset alarm transmission period may be an alarm delay section or the number of alarm trigger signals, but is not limited thereto.

Figure 3A:
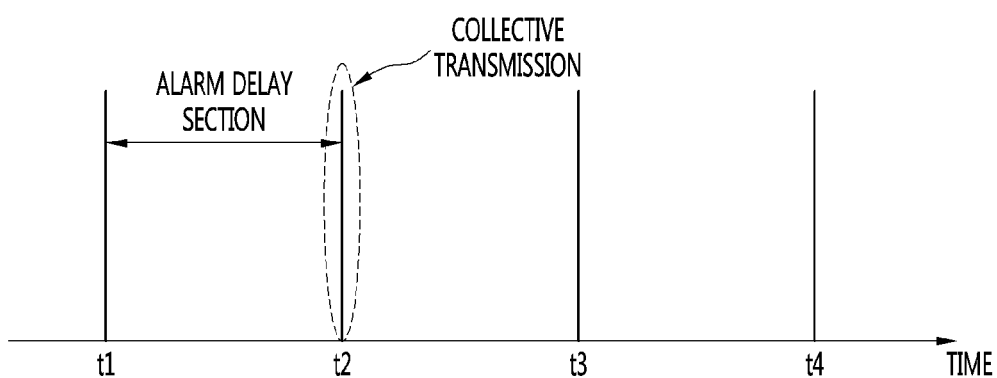
FIGS. 3A and 3B are views illustrating an alarm transmission period.

For example, the alarm delay section may be set as shown in FIG. 3A. That is, a first alarm delay section may be set between t1 and t2, a second alarm delay section may be set between t2 and t3, and a third alarm delay section may be set between t3 and t4, but the first to third alarm delay sections are not limited thereto. The first to third alarm delay sections may have the same section width, but are not limited thereto.

When the alarm delay section is set, one or more alarm trigger signals generated in the alarm delay section are not transmitted to the corresponding applications immediately when the corresponding alarm trigger signals are generated, but may be delayed until an end time of the alarm delay section. During the delay, the alarm trigger signals may be temporarily stored in the memory 170. For example, the end time may be t2 in the first alarm delay section, may be t3 in the second alarm delay section, and may be t4 in the third alarm delay section.

Figure 3B:
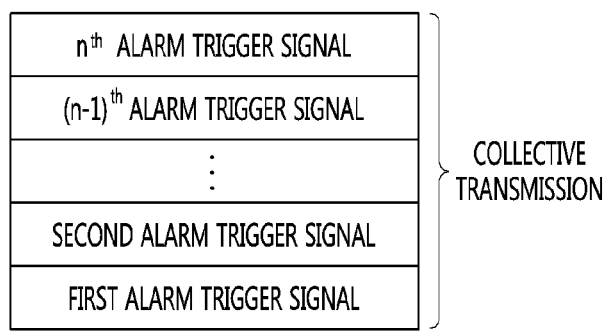

For example, one or more alarm trigger signals generated in the first alarm delay section may be delayed until t2 and temporarily stored in the memory 170, and then, the one or more alarm trigger signals may be collectively transmitted to the corresponding applications at or after t2 (see FIG. 3B). One or more alarm trigger signals generated in the second and third alarm delay sections may be collectively transmitted in the same manner as in the first alarm delay section.

A width of the alarm delay section may be set by a terminal manufacturer or may be arbitrarily set by a user.

As described above, an alarm trigger signal, which is required to be necessarily notified by alarm among one or more alarm trigger signals generated in the corresponding alarm delay section, may be transmitted to the corresponding application in real time immediately when the alarm trigger signal is generated, without any delay until the end time of the corresponding alarm delay section.

For example, the plurality of applications may be stored in the memory 170 and may be enabled under control of the control unit 180. When the alarm trigger signal is transmitted to the corresponding application stored in the memory 170, the corresponding application may be enabled. Due to the enabling of the corresponding application, relevant information, for example, schedule information of the calendar application may be displayed on the display unit 151 so as to be notified to the user as alarm information. The alarm information may be outputted as a voice or a vibration.

As shown in FIG. 4A, in a case where first to fifth alarm trigger signals TR1 to TR5 are generated during the alarm delay section, the first to fifth alarm trigger signals TR1 to TR5 are not transmitted to the corresponding applications immediately when the first to fifth alarm trigger signals TR1 to TR5 are generated. As shown in FIG. 4B, the first to fifth alarm trigger signals TR1 to TR5 may be delayed until the end time of the alarm delay section and be then collectively transmitted to the corresponding applications at the end time of the alarm delay section.

For example, as shown in FIG. 3B, the number of alarm trigger signals may be set in the memory 170. For example, n alarm trigger signals may be set as the number of alarm trigger signals which satisfies a condition that collectively transmits one or more alarm trigger signals.

In this case, one or more alarm trigger signals generated until the number of the one or more alarm trigger signals becomes n are not transmitted to the corresponding applications. When the number of the one or more alarm trigger signals becomes n, the one or more alarm trigger signals may be collectively transmitted to the corresponding applications.

The one or more alarm trigger signals are stored in the memory 170 whenever generated. The control unit 180 checks the number of the one or more alarm trigger signals stored in the memory 170. When the number of the one or more alarm trigger signals becomes n, the control unit 180 performs control to collectively transmit the one or more alarm trigger signals to the corresponding applications.

As shown in FIG. 5A, in a case where five alarm trigger signals TR1 to TR5 are set to be collectively transmitted to first to fifth applications when the five alarm trigger signals TR1 to TR5 are generated, although the first to fourth alarm trigger signals TR1 to TR4 are generated, the first to fourth alarm trigger signals TR1 to TR4 may not be transmitted to the first to fifth applications and may be stored in the memory 170.

After that, as shown in FIG. 5B, when the fifth alarm trigger signal TR5 is generated and stored in the memory 170, and thus, the number of alarm trigger signals stored in the memory 170 becomes five, the first to fifth alarm trigger signals TR1 to TR5 may be collectively transmitted to the first to fifth applications, respectively.

Referring again to FIG. 2, when the alarm trigger signal does not satisfy the preset alarm transmission period, the control unit 180 returns to operation S230 and determines whether a subsequent alarm trigger signal is generated.

Operations S230 to S270 are repeated. When one or more alarm trigger signals are generated and the generated one or more alarm trigger signals satisfy the preset alarm transmission period, the control unit 180 performs control to collectively transmit the one or more alarm trigger signals to the corresponding applications (S290).

As described above, instead of transmitting alarm trigger signals to the corresponding applications whenever generated, alarm trigger signals are temporarily stored in the memory 170 until the alarm trigger signals satisfy the preset alarm transmission period, and the alarm trigger signals are collectively transmitted to the corresponding applications after the alarm trigger signals satisfy the preset alarm transmission period, thereby significantly reducing current consumption. Ultimately, power consumption can be reduced.

Instead of transmitting the first to fifth alarm trigger signals TR1 to TR5 in real time as shown in FIG. 6A, the first to fifth alarm trigger signals TR1 to TR5 may be collectively transmitted the first to fifth applications at a specific time, that is, the end time of the alarm delay section as shown in FIG. 6B. In this case, it can be confirmed that the total current consumption of the first to fifth alarm trigger signals TR1 to TR5 collectively transmitted as shown in FIG. 6B is considerably small, as compared to the total current consumption of the first to fifth alarm trigger signals TR1 to TR5 as shown in FIG. 6A. One current consumption peak line shown in FIG. 6B indicates the total current consumption obtained by adding up current consumption of the first to fifth alarm trigger signals TR1 to TR5 shown in FIG. 6A.

Figure 7:
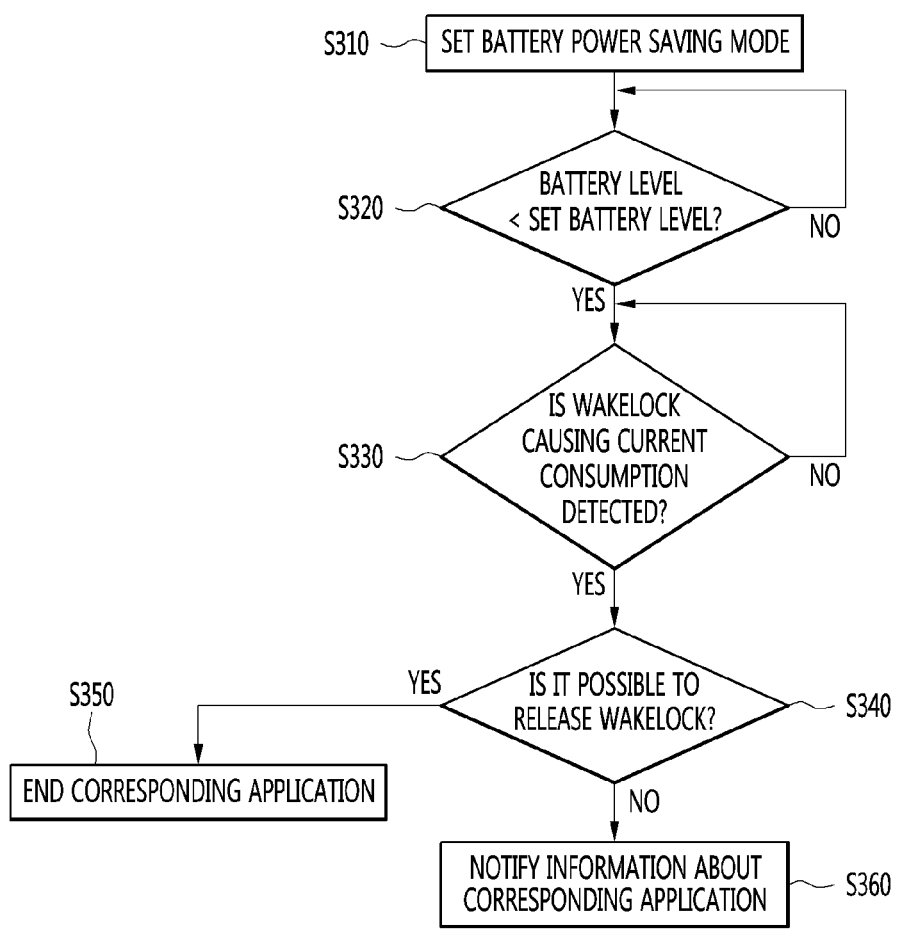
FIG. 7 is a flowchart illustrating a method for controlling a mobile terminal according to a second embodiment of the present invention.
Figure 8:
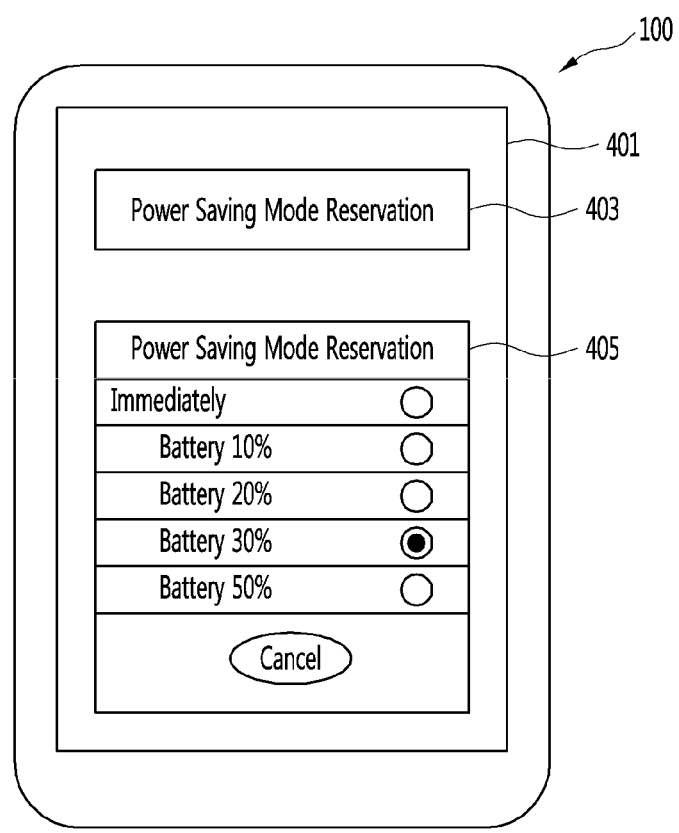
FIG. 8 is a view illustrating a state in which a power saving mode reservation item is displayed.

FIGS. 7 to 9 illustrate a method for reducing power consumption by ending an application holding a wakelock.

FIG. 7 is a flowchart illustrating a method for controlling the mobile terminal according to a second embodiment of the present invention.

Referring to FIG. 7, the control unit 180 of the mobile terminal 100 performs control to set a battery power saving mode (S310).

When a setting command for the battery power saving mode is inputted from a user, the control unit 180 may perform control to set the battery power saving mode according to the user's setting command.

For example, as shown in FIG. 8, a power saving mode reservation item 403 may be displayed on a screen 401 of the display unit 151. The item may be a menu, but is not limited thereto. When a touch command for the power saving mode reservation item 403 is inputted, a power saving mode reservation window 405 including one or more battery levels may be displayed. When a touch command for one battery level among the one or more battery levels is inputted, a battery power saving mode may be set to the corresponding battery level. A case where the battery power saving mode is set to 30% of the battery level is illustrated in FIG. 8, but the battery power saving mode is not limited thereto.

The control unit 180 continuously detects a battery level of a battery installed in the mobile terminal 100. The control unit 180 determines whether the detected battery level is less than the battery level set as the battery power saving mode (S320).

When the detected battery level is less than the battery level set as the battery power saving mode, the control unit 180 detects a wakelock causing current consumption (S330).

The wakelock may serve to prevent an application from entering a sleep mode.

However, although a user ends applications such as games recently developed by developers, the wakelock prevents the applications from being ended, and thus, the applications may continuously operate in an active mode. As such, if the applications are not ended by the wakelock, the applications are in an enabled state even when the user does not use the applications. Due to these enabled applications, current consumption continuously occurs and the battery runs down quickly.

As the frequently found wakelock, there are mediaScannerService, NetworkLocationLocator, SyncLoop Wakelock, and the like. Among them, MediaScannerService is a wakelock generated when media are scanned, and MediaScannerService is generated when booting is performed or a media file is added. NetworkLocationLocator is a wakelock having excessive battery consumption, and NetworkLocationLocator is generated when a location service is used. SyncLoop Wakelock may be used for synchronization. These wakelocks all have excessive current consumption and the applications are still in an enabled state even when the user ends the applications, thus causing current consumption.

Additionally, the wakelock is frequently set in applications such as a game application or a shopping application.

The detection of the wakelock may be performed by software provided by a manufacturer or a separate application provided by a developer, but is not limited thereto.

In operation S330, a threshold value may be set for the wakelock causing current consumption. That is, when a wakelock is less than the threshold value even though the wakelock causes the current consumption, the corresponding wakelock may not be detected as the wakelock causing the current consumption. When the wakelock is equal to or greater than the threshold value, the corresponding wakelock may be detected as the wakelock causing the current consumption.

When the wakelock causing the current consumption is detected, the control unit 180 determines whether it is possible to release the wakelock (S340).

When it is possible to release the wakelock, the control unit 180 performs control to release the wakelock and end an application holding the wakelock (S350).

When it is impossible to release the wakelock, the control unit 180 performs control to notify information about the application holding the wakelock (S360). That is, the information about the corresponding application may be displayed on the screen of the display unit 151.

When the screen is turned off in a sleep mode state and it is impossible to release a plurality of wakelocks, pieces of information about a plurality of applications holding the plurality of wakelocks may be temporarily stored in the memory 170. When the sleep mode is changed to the active mode and the screen is turned on, the pieces of the information about the plurality of applications holding the plurality of wakelocks stored in the memory 170 may be displayed on the screen.

Figure 9A:
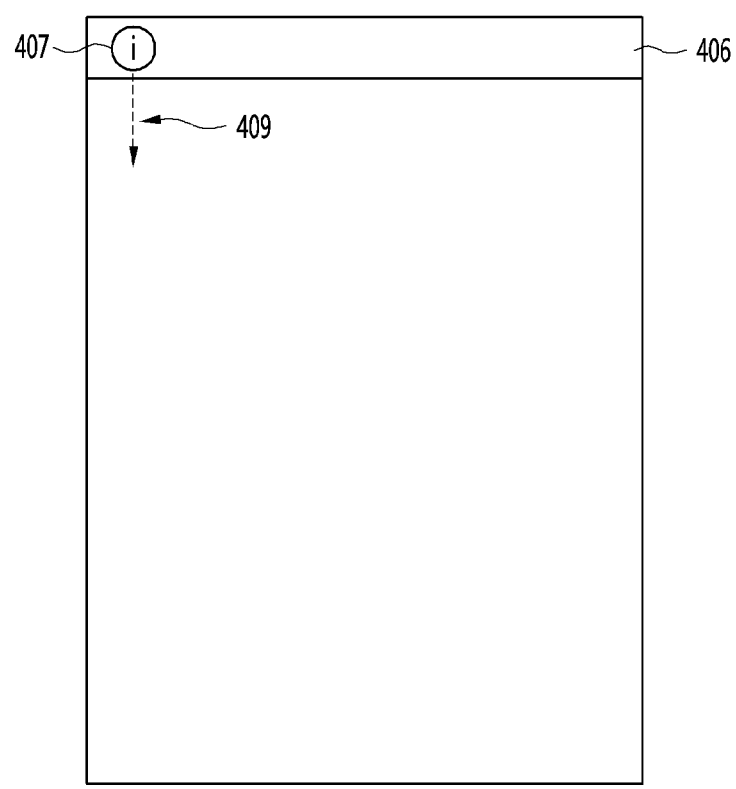
FIGS. 9A to 9D are views illustrating a method for ending an application based on information about the corresponding application holding a wakelock.

As shown in FIG. 9A, a notification item 407 may be displayed on a state display window 406 disposed in an upper portion of the screen. The item may be an icon, but is not limited thereto.

When the notification item 407 is touched and dragged in one direction, for example, a vertical direction, the pieces of the information about the plurality of applications holding the plurality of wakelocks may be displayed on the screen by sliding-in in a touch dragging direction 409. Pieces of information about three applications are illustrated in FIG. 9B, but the present invention is not limited thereto.

Figure 9B:
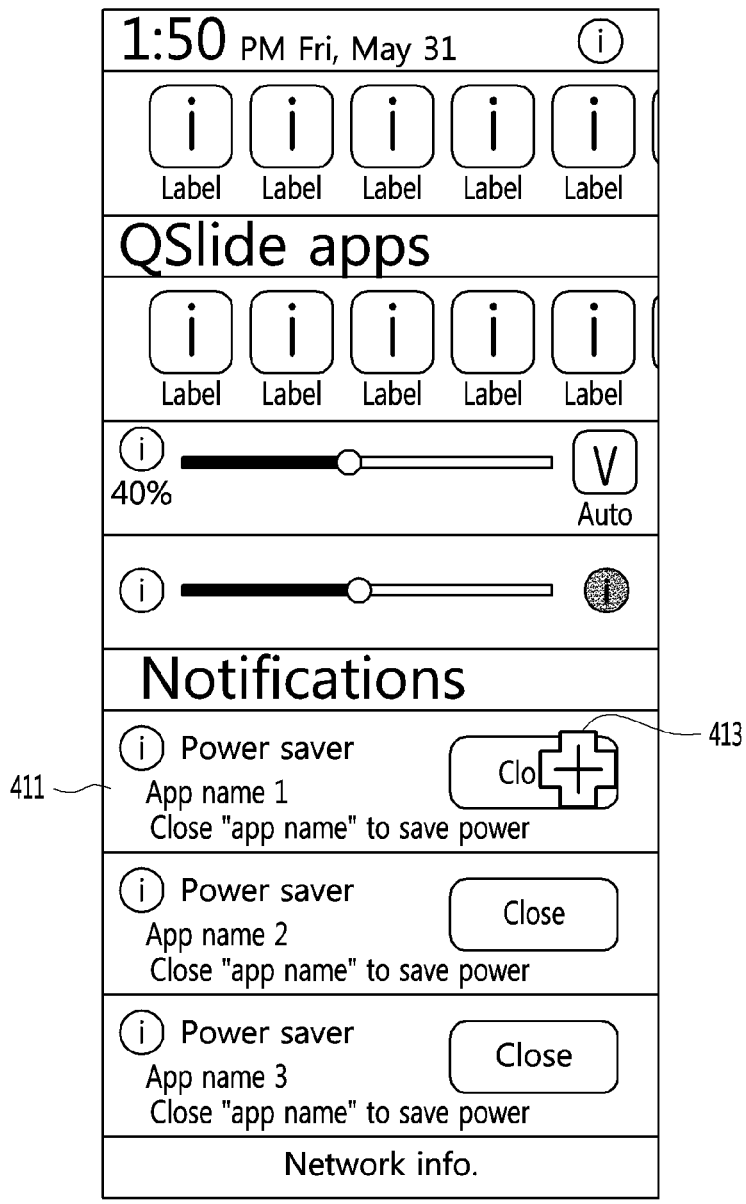

For example, when a touch command for a "close button" 413 of a first application 411 in FIG. 9B is inputted, the first application 411 may be ended and removed on the screen as shown in FIG. 9O. The ending of the first application 411 means that the first application 411 is disabled and thus current consumption caused by the first application 411 does not occur any more.

When the first application 411 is not ended even though the touch command for the "close button" 413 is inputted, the first application 411 may be forcibly ended.

Figure 9C:
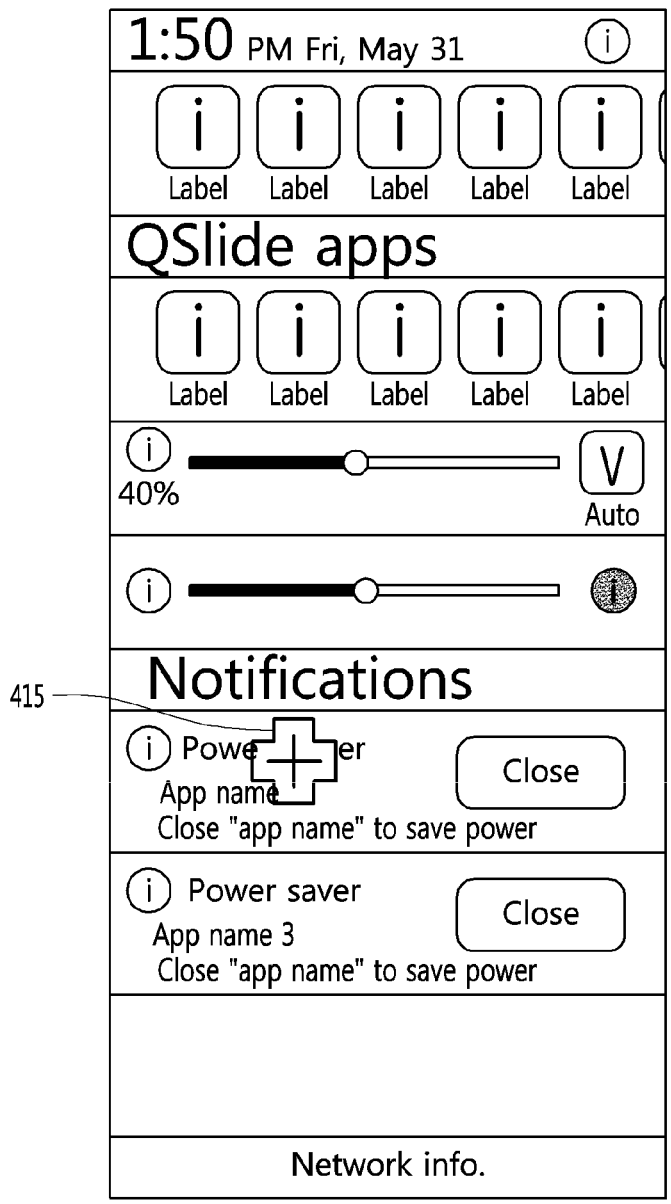
Figure 9D:
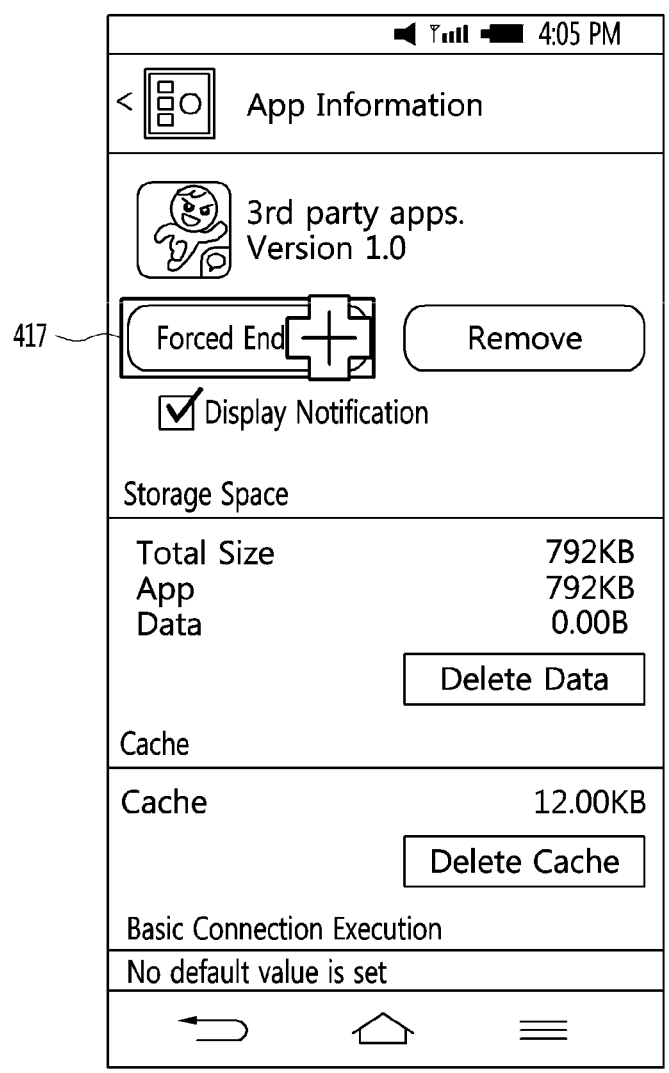

For example, when a touch command for a region 415 except for the "close button" 413 of the first application 411 in FIG. 9C, for example, a touch command for the first application 411 is inputted, a "forced end button" 417 capable of forcibly ending the first application 411 may be displayed as shown in FIG. 9D. When a touch command for the "forced end button" 417 is inputted, the corresponding application, that is, the first application 411 is forcibly ended and thus current consumption does not occur any more.

FIGS. 10 to 17 illustrate a method for efficiently adjusting power consumption by selectively using a plurality of power saving modes and improving user convenience by easily operating a power saving mode setting and a power saving mode execution.

Figure 10:
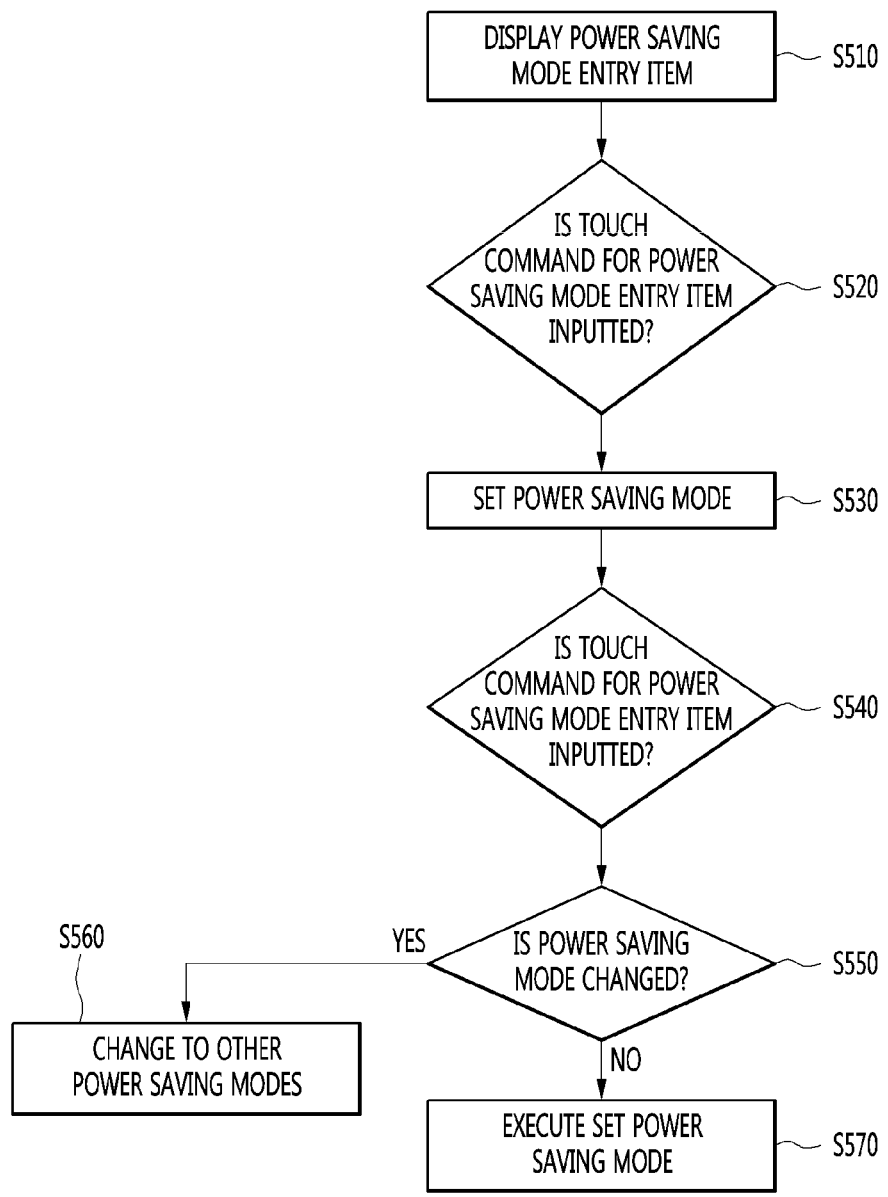
FIG. 10 is a flowchart illustrating a method for controlling a mobile terminal according to a third embodiment of the present invention.

FIG. 10 is a flowchart illustrating a method for controlling the mobile tetminal according to a third embodiment of the present invention.

Referring to FIG. 10, the control unit 180 of the mobile terminal 100 performs control to display a power saving mode entry item (613 of FIG. 11) on a display unit 151 (S510).

Before the power saving mode entry item 613 is displayed, operation S310 of the second embodiment (FIG. 7) may be performed in advance, but the present invention is not limited thereto.

Figure 11:
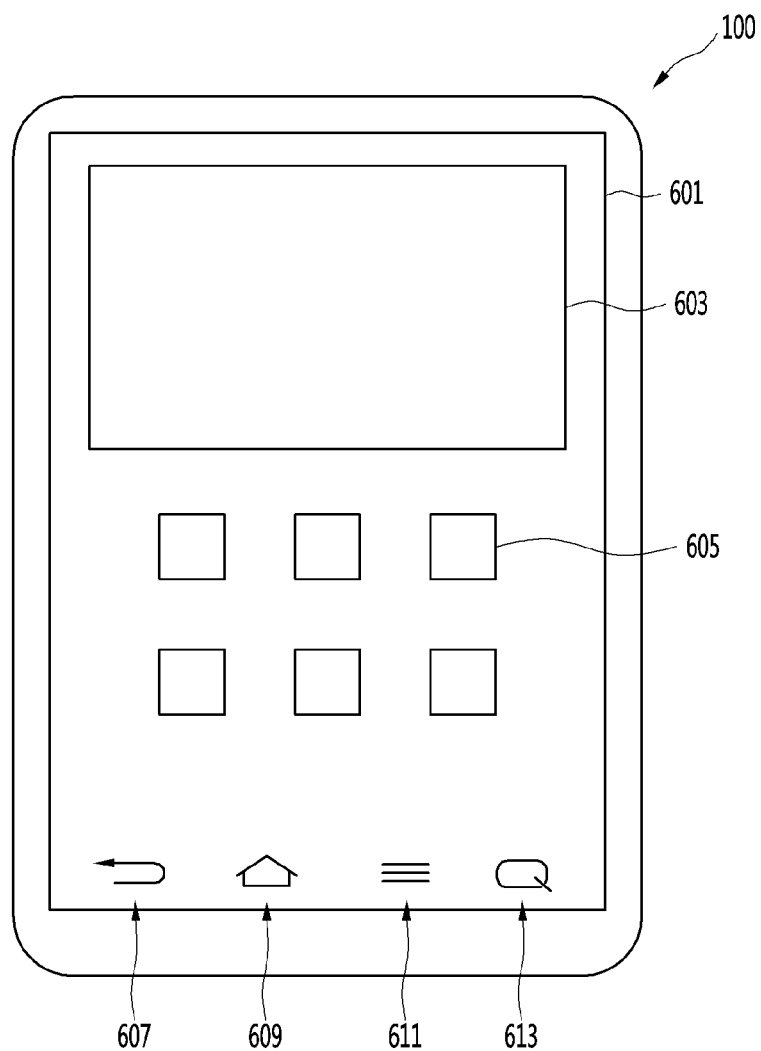
FIG. 11 is a view illustrating a state in which a power saving mode entry item is displayed.

As shown in FIG. 11, the power saving mode entry item 613 may be displayed in a lower region of a screen 601 together with other buttons, for example, a previous button 607, a home button 609, and an option menu button 611. Reference numeral 603 represents a widget window, and reference numeral 605 represents executable items.

Figure 12:
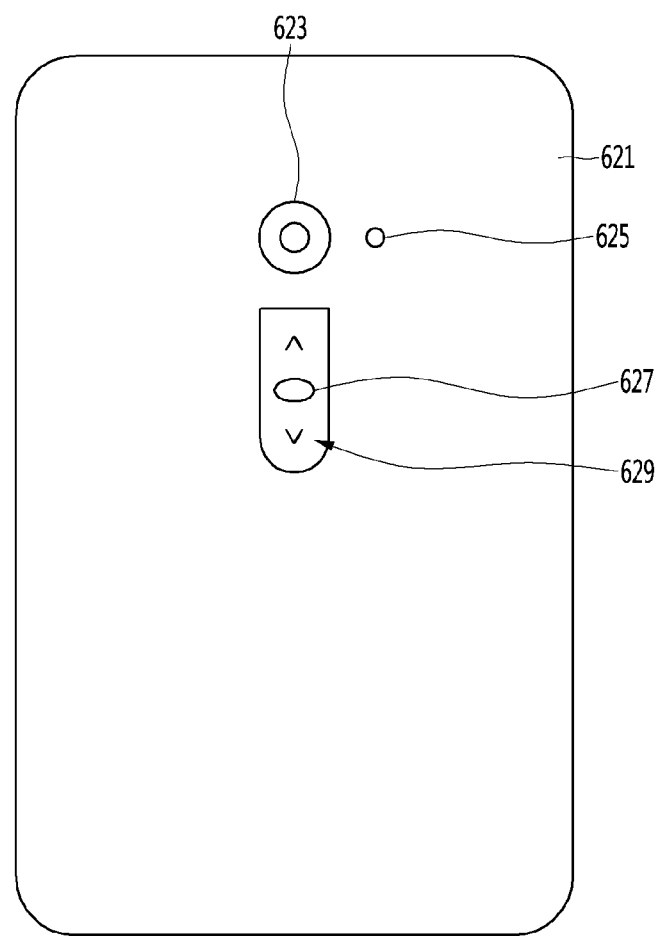
FIG. 12 is a view illustrating a backside of a mobile terminal.

As shown in FIG. 12, a lock/power button 627 may be used instead of the power saving mode entry item 613. That is, when a long touch command for the lock/power button 627 is inputted for a certain time, for example, one second to three seconds, the power saving mode entry item 613 may be executed and a window including power saving mode related information (see FIG. 13A) may be displayed and recognized in operation S520.

FIG. 12 is a view illustrating a backside of a mobile terminal, and reference numerals 621, 623, 625, and 629 respectively represent a rear cover, a rear camera, a flash, and a volume button.

When the screen is turned on, the power saving mode entry item 613 may be always displayed like other buttons 607, 609, and 611. Alternatively, when a specific situation occurs, for example, when a battery residual capacity is less than the preset battery level (see the second embodiment) for the power saving mode, the power saving mode entry item 613 may be generated and displayed adjacent to the option menu button 611 in the lower region of the screen.

The control unit 180 determines whether a user's touch command for the power saving mode entry item 613 is inputted (S520).

When the user's touch command is inputted, the control unit 180 performs control to set a power saving mode (S530).

Figure 13A:
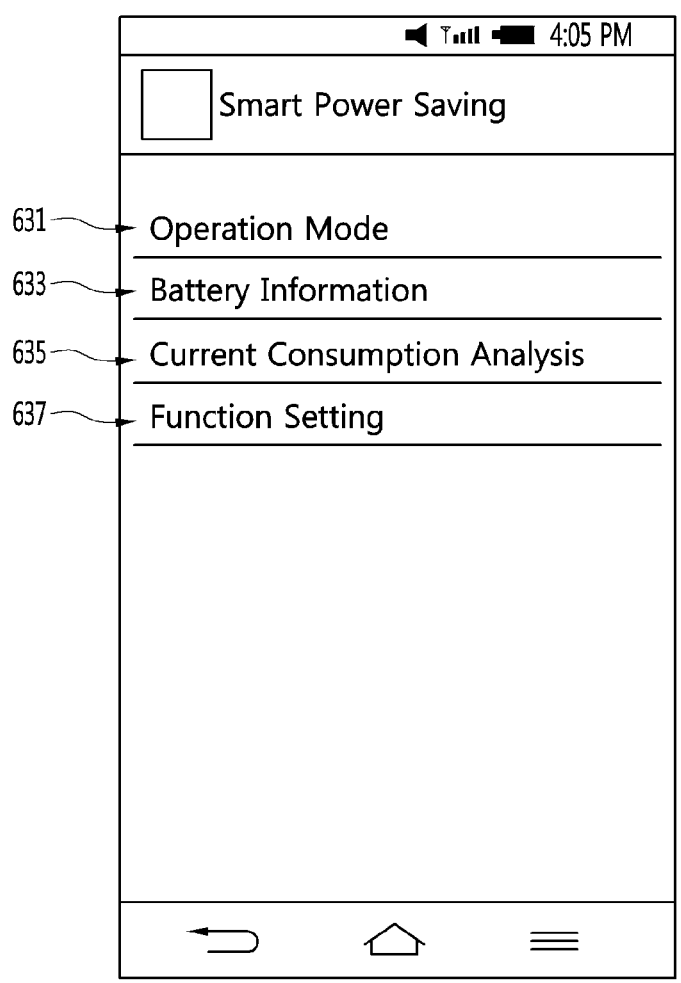
FIGS. 13A to 13C are views illustrating a method for setting a power saving mode.

For example, when the user's touch command is inputted, the window including the power saving mode related information may be displayed as shown in FIG. 13A. The window may include, for example, an operation mode menu 631, a battery information menu 633, a current consumption analysis menu 635, and a function setting menu 637.

Figure 13B:
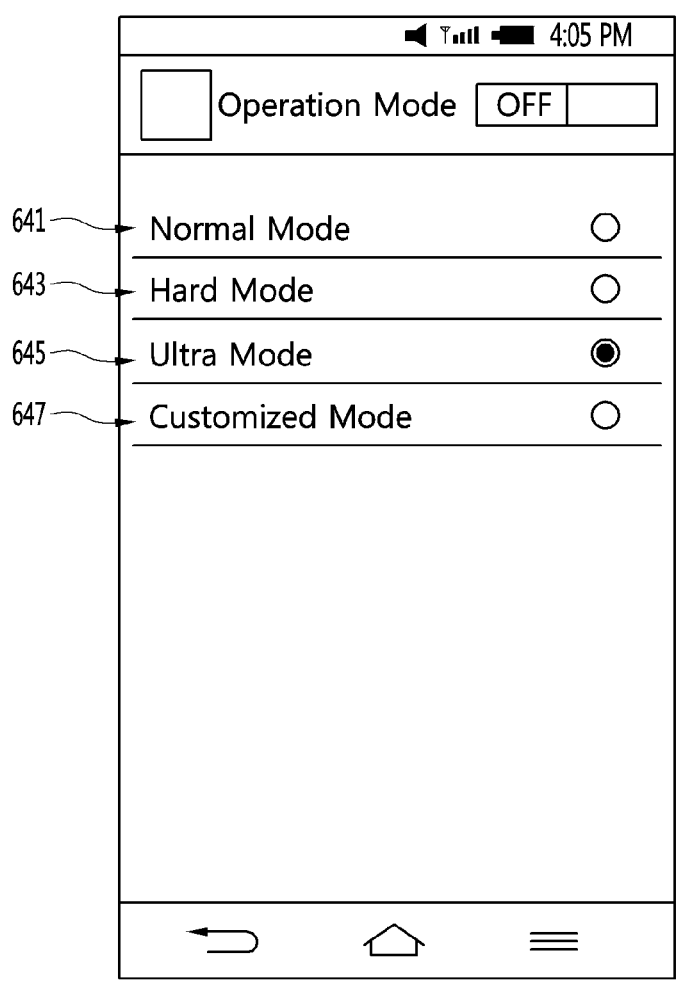

As shown in FIG. 13B, the operation mode menu 631 may include a plurality of power saving mode menus 641, 643, 645, and 647 having different degrees of power consumption. For example, the plurality of power saving mode menus 641, 643, 645, and 647 are a normal mode, a hard mode, an ultra mode, and a customized mode, respectively.

Figure 15A:
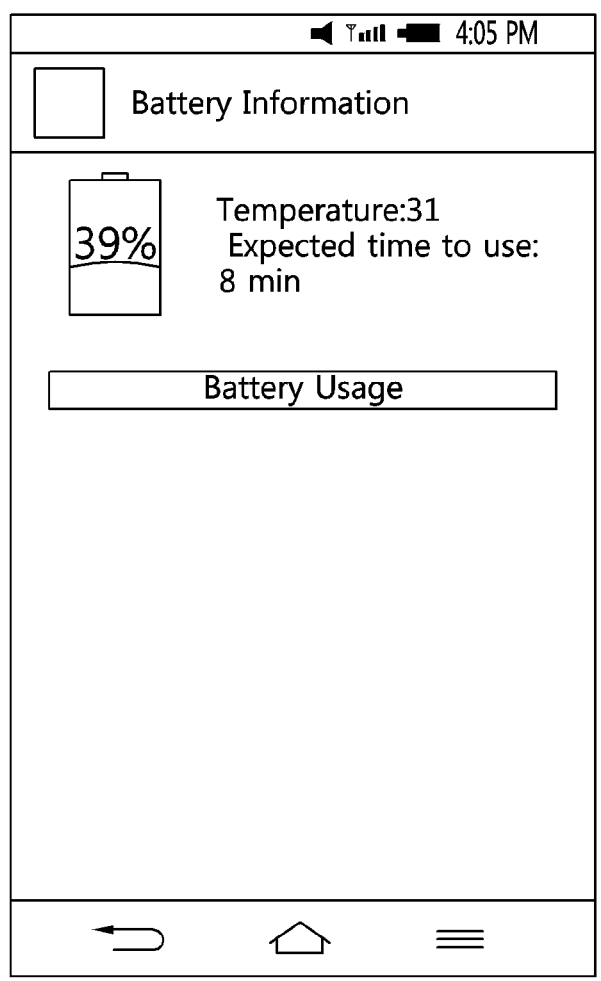
FIGS. 15A to 15C respectively illustrate a window for battery information, a window for a current consumption analysis, and a window for function setting.

As shown in FIG. 15A, the battery information menu 633 may include battery related information, for example, a current temperature or an expected time to use of a battery.

Figure 15B:
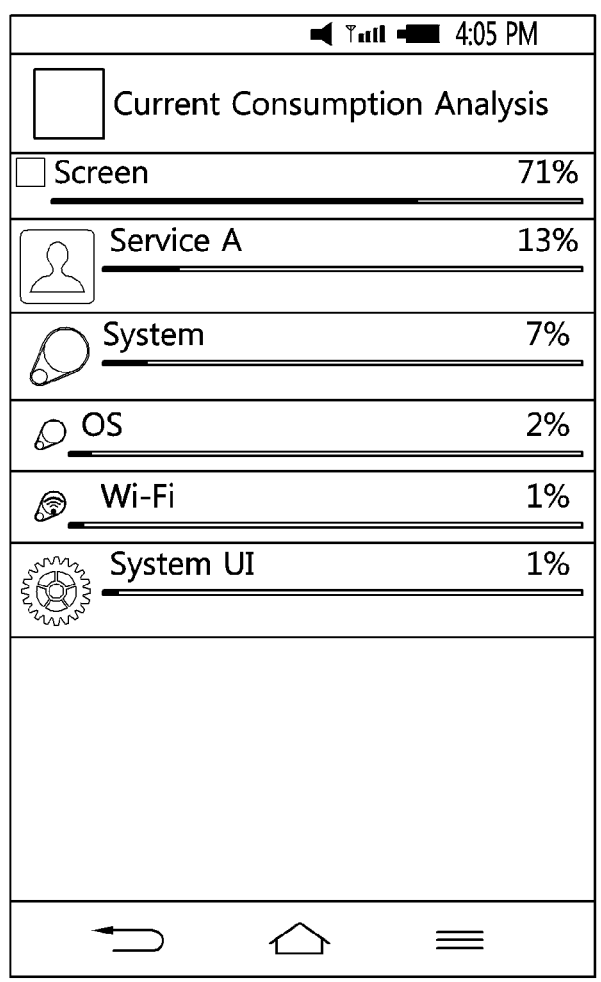

As shown in FIG. 15B, the current consumption analysis menu 635 may include an amount of current consumed by each of a screen including a backlight of a corresponding mobile terminal, a network such as Wi-Fi, and a plurality of applications installed in a system operation unit or a corresponding mobile terminal.

Figure 15C:
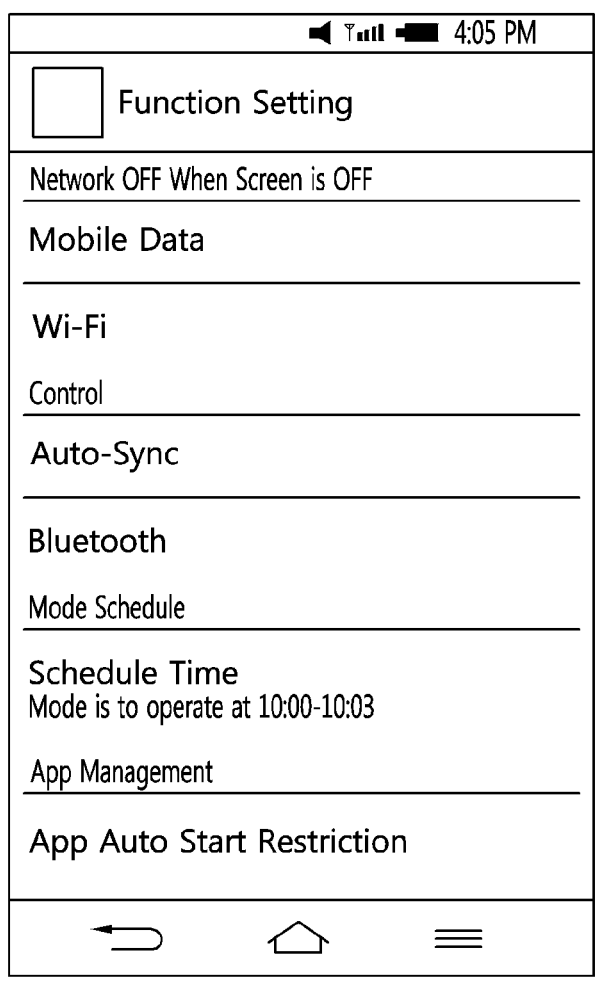
Figure 17:
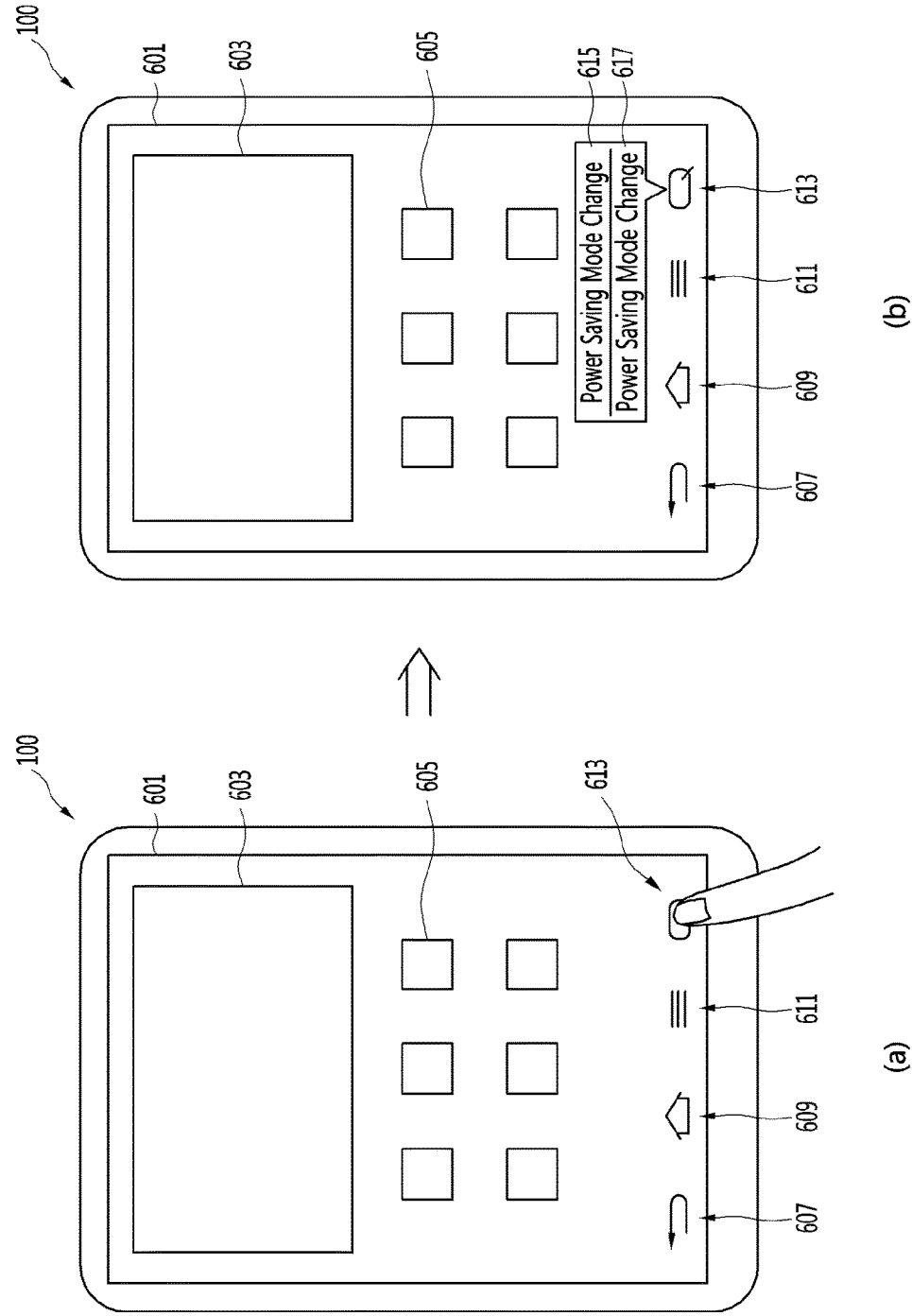
FIG. 17 illustrate a user interface for operating a power saving mode change or a power saving mode execution by using a power saving mode entry item.

As shown in FIG. 15C, the function setting menu 637 may include a plurality of functions provided in the mobile terminal 100. The plurality of functions may include a screen-related network function, a synchronization function, a usage schedule of the mobile terminal 100, and an automatic start restriction function of an application.

When a touch command for the operation mode menu 631 is inputted from the user, a window including a plurality of power saving mode menus may be displayed as shown in FIG. 13B. That is, a normal mode menu 641, a hard mode menu 643, an ultra mode menu 645, and a customized mode menu 647 may be displayed.

As shown in FIG. 16, the restriction degree of the function may vary according to the normal mode, the hard mode, and the ultra mode. That is, more functions may be restricted in the hard mode than in the normal mode, and more functions may be restricted in the ultra mode than in the hard mode.

For example, Wi-Fi OFF, Wi-Fi tethering OFF, Bluetooth OFF, GPS OFF, and Auto-Sync OFF, which are not restricted in the normal mode, may be set to be restricted in the hard mode, but the present invention is not limited thereto.

For example, mobile data OFF, which is not restricted in the hard mode, may be set to be restricted in the ultra mode, but the present invention is not limited thereto.

Figure 13C:
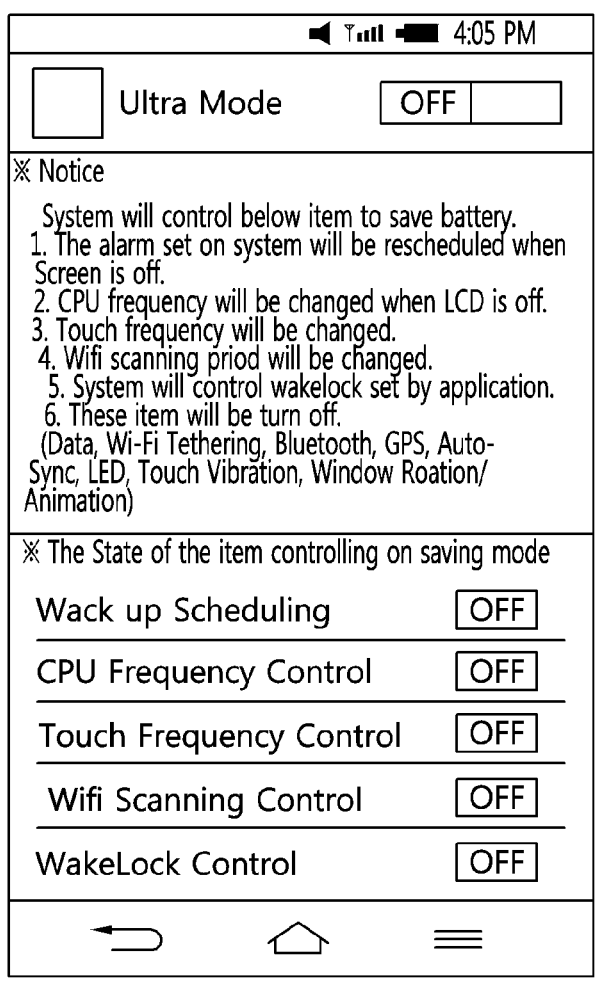

When a touch command for the ultra mode menu 645 is inputted in the window shown in FIG. 13B, a plurality of function menus capable of being restricted in the ultra mode may be displayed as shown in FIG. 13C. As shown in FIG. 16, these function menus may include alarm scheduling, CPU frequency restriction, touch response speed change, Wi-Fi scanning period change, wakelock type control, notification LED OFF, touch vibration OFF, automatic screen orientation switching OFF, screen change animation OFF, Wi-Fi OFF, Wi-Fi tethering OFF, Bluetooth OFF, GPS OFF, Auto-Sync OFF, mobile data OFF, brightness adjustment, and LCD turn-off time control.

By default, each function menu may be set to be "OFF", and each function menu may be set to be "ON" for function restriction. The "ON" setting means that the function restriction is enabled, and the "OFF" setting means that the function restriction is released and disabled.

Figure 14:
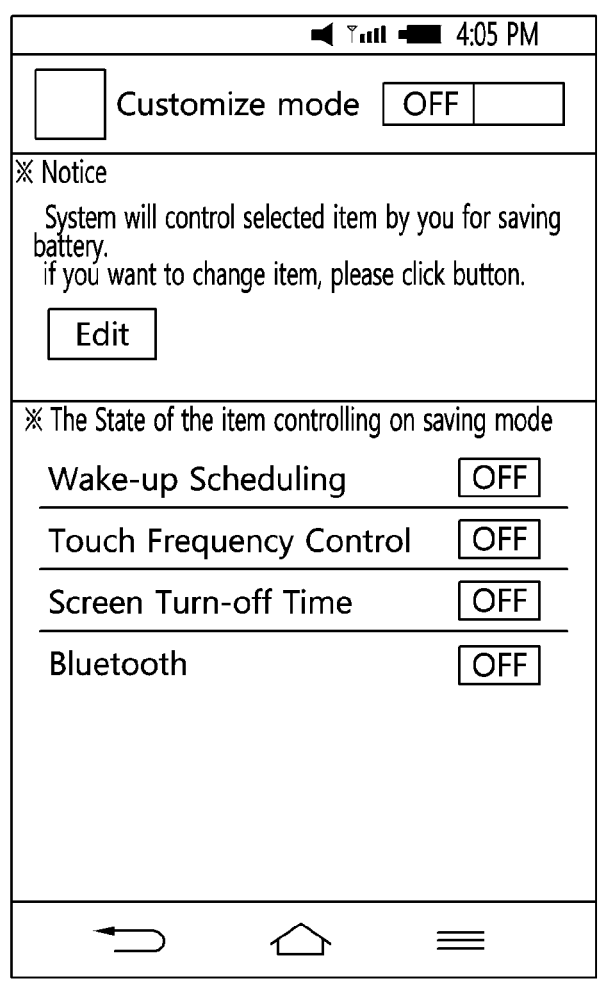
FIG. 14 illustrates a window for a customized mode.

When a touch command for the customized mode menu 647 in the window shown in FIG. 13B is inputted, a window including function menus capable of being easily selected and set by a user may be displayed as shown in FIG. 14. These function menus may include wakeup scheduling, touch frequency control, screen turn-off time, and Bluetooth.

In operation S530, a power saving mode may be set, and preparation for execution of the power saving mode may be completed.

The power saving mode entry item 613 may be continuously displayed in the lower region of the screen.

The control unit 180 determines whether a touch command for the power saving mode entry item 613 is inputted (S540). That is, when the touch-and-hold command for the power saving mode entry item 613 is inputted as shown in FIG. 17A, the control unit 180 performs control to display a window including a power saving mode change menu 615 and a power saving mode execution menu 617 on the screen as shown in FIG. 17B. At this time, the window including the power saving mode change menu 615 and the power saving mode execution menu 617 may be displayed adjacent to the power saving mode entry item 613, but is not limited thereto.

The control unit 180 determines whether a power saving mode is changed (S550). For example, as shown in FIG. 17B, when a touch command for the power saving mode change menu 615 is inputted, the control unit 180 performs control to change a currently set power saving mode to other power saving modes (S560).

To this end, the control unit 180 performs control to display the window including the plurality of power saving modes as shown in FIG. 13B and performs control to change an operation mode to corresponding power saving modes in response to touch commands for the plurality of power saving modes.

For example, when the currently set power saving mode is the ultra mode, the ultra mode may be changed to the normal mode, the hard mode, or the customized mode according to the user's touch command.

As shown in FIG. 17B, when a touch command for the power saving mode execution menu 617 is inputted, the control unit 180 may perform control to execute the currently set power saving mode. Due to this execution, restriction operations of functions set to be "ON" in the power saving modes are performed, thereby reducing power consumption.

Although the first to third embodiments have independently been described above, the present invention is not limited thereto. That is, the first to third embodiments may be independently used and may be used in combination.

It is apparent that the technical idea of the present invention can also be applied to a flexible mobile terminal, a watch type mobile terminal, and a glass type mobile terminal, as well as the mobile terminal (100 of FIG. 1).

The invention can also be embodied as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs) and carrier waves (e.g., transmission through the Internet). Additionally, the computer may include the control unit 180 of a terminal. Accordingly, the detailed description is not construed as being limited in all aspects and should be considered as illustrative. The scope of the invention should be determined by reasonable interpretation of the appended claims, and all modifications within equivalent ranges of the present invention are included in the scope of the present invention.

INDUSTRIAL APPLICABILITY

The present invention can be applied to a flexible mobile terminal, a watch type mobile terminal, and a glass type mobile terminal, as well as a mobile terminal.

The invention claimed is:

1. A method for controlling a mobile terminal, the method comprising:
   determining whether a plurality of alarm trigger signals corresponding, respectively, to a plurality of applications are generated, wherein the plurality of alarm trigger signals activate the plurality of applications, respectively;
   storing the plurality of alarm trigger signals in a memory;
   determining whether the plurality of alarm trigger signals satisfy a set alarm transmission period;
   when the set alarm transmission period is satisfied, collectively transmitting the plurality of alarm trigger signals to the plurality of applications at a specific time, wherein each of the plurality of alarm trigger signals is transmitted to a corresponding application;
   when the plurality of alarm trigger signals is collectively transmitted to the plurality of applications, activating the plurality of applications; and
   outputting, by the activated plurality of applications, a plurality of alarms corresponding, respectively, to the activated plurality of applications.

2. The method of claim 1, further comprising:
   determining whether an alarm trigger signal required to be necessarily transmitted is present among the plurality of alarm trigger signals; and
   when the alarm trigger signal required to be necessarily transmitted is present, transmitting the alarm trigger signal at a generation time thereof.

3. The method of claim 2, wherein the set alarm transmission period is one of an alarm delay section and the number of the plurality of alarm trigger signals.

4. The method of claim 3, wherein the specific time is an end time of the alarm delay section, and
   the method further comprises collectively transmitting the plurality of alarm trigger signals at the end time of the alarm delay section.

5. The method of claim 3, wherein the specific time is a time when the number of the plurality of alarm trigger signals becomes the number of alarm trigger signals, and
   the method further comprises collectively transmitting the plurality of alarm trigger signals at the time when the number of the plurality of alarm trigger signals becomes the number of alarm trigger signals.

6. The method of claim 1, further comprising:
   when a battery level is less than a set battery level, detecting a wakelock which causes current consumption; and
   notifying information about an application holding the wakelock which causes the current consumption.

7. The method of claim 6, further comprising:
   determining whether it is possible to release the wakelock of the application holding the wakelock which causes the current consumption; and
   when it is possible to release the wakelock, ending the application holding the wakelock which causes the current consumption.

8. The method of claim 6, further comprising displaying, as a notification item, the information about the application holding the wakelock which causes the current consumption.

9. The method of claim 8, further comprising forcibly ending the application holding the wakelock which causes the current consumption by using the notification item.

10. The method of claim 6, further comprising, when a screen is turned on, displaying, on the screen, the application information holding the wakelock which causes the current consumption.

11. The method of claim 1, further comprising:
    displaying a power saving mode entry item; and
    setting a power saving mode in response to a touch command for the power saving mode entry item.

12. The method of claim 11, further comprising displaying a power saving mode change menu and a power saving mode execution menu in response to a touch-and-hold command for the power saving mode entry item.

13. The method of claim 12, wherein the power saving mode change menu and the power saving mode execution menu are displayed adjacent to the power saving mode entry item.

14. A mobile terminal comprising:
    a display configured to display an image; and
    a control unit configured to:
    determine whether a plurality of alarm trigger signals corresponding, respectively, to a plurality of applications are generated, wherein the plurality of alarm trigger signals activate the plurality of applications, respectively,
    store the plurality of alarm trigger signals in a memory, determine whether the plurality of alarm trigger signals satisfy a set alarm transmission period, when the set alarm transmission period is satisfied, collectively transmit the plurality of alarm trigger signals to the plurality of applications at a specific time, wherein each of the plurality of alarm trigger signals is transmitted to a corresponding application, activate the plurality of applications when the plurality of alarm trigger signals are collectively transmitted to the plurality of applications, and output, by the activated plurality of applications, a plurality of alarms corresponding, respectively, to the activated plurality of applications.

15. The mobile terminal of claim 14, wherein the set alarm transmission period is an alarm delay section, wherein the specific time is an end time of the alarm delay section, and wherein the control unit collectively transmits the plurality of alarm trigger signals at the end time of the alarm delay section.

16. The mobile terminal of claim 14, wherein the set alarm transmission period is the number of alarm trigger signals, wherein the specific time is a time when the number of the plurality of alarm trigger signals becomes the number of alarm trigger signals, and wherein the control unit collectively transmits the plurality of alarm trigger signals at the time when the number of the plurality of alarm trigger signals becomes the number of alarm trigger signals.

17. The mobile terminal of claim 14, wherein, when a battery level is less than a set battery level, the control unit detects a wakelock which causes current consumption and notifies information about an application holding the wakelock which causes the current consumption.

18. The mobile terminal of claim 17, wherein the control unit determines whether it is possible to release the wakelock of the application holding the wakelock which causes the current consumption, and when it is possible to release the wakelock, the control unit ends the application holding the wakelock which causes the current consumption.

19. The mobile terminal of claim 14, wherein the control unit displays a power saving mode entry item and sets a power saving mode in response to a touch command for the power saving mode entry item.

* * * * *